3,038,781
PROCESS FOR THE PURIFICATION OF TANTALUM PENTACHLORIDE
Walter Scheller, Muenchenstein, and Jean Renard, Muttenz, Switzerland, assignors to Ciba Limited, Basel, Switzerland, a Swiss firm
No Drawing. Filed Sept. 8, 1959, Ser. No. 838,402
Claims priority, application Switzerland Sept. 25, 1958
12 Claims. (Cl. 23—21)

This invention relates to the purification of tantalum pentachloride.

One method for obtaining tantalum involves using the chlorides of the metal which are obtained by the chlorination of ores or ferro alloys containing tantalum. In general the chlorination processes are carried out in the presence of a reducing agent, for example, carbon. During the chlorination there are formed, in addition to the desired chlorides of tantalum, chlorides of other metals present in the ore, and, owing to the oxidic character of the ore, also oxychlorides, the presence of which in the later stages of the process is harmful.

The present invention provides a process for the purification of tantalum pentachloride to remove undesired chlorides and oxychlorides of other metals, wherein the impure chloride in the gaseous phase is passed together with hydrogen over a heated alkali metal halide or alkaline earth metal halide or a mixture of such halides.

The alkali metal or alkaline earth metal halides used must possess the property of forming stable double salts exclusively with the undesired chlorides and oxychlorides that are partially reduced by the hydrogen, but must not form any double salt with the tantalum pentachloride to be purified, in the range of operational temperature, below the limit at which tantalum pentachloride is reduced to lower valencies. This limit is located at a temperature of approximately 550° C. which is, therefore, the upper limit for the temperature to be maintained in the reaction zone. The halide constituting the granular bed forms the above-mentioned double salts with the chlorides and oxychlorides to be removed from the impure tantalum pentachloride, which double salts are solid at the reaction temperature, and therefore, are retained by the bed.

By suitably selecting the alkali metal or alkaline earth metal halides there are also separated those chlorides which are not reduced or partially reduced, i.e. reduced to intermediary stages of valency by the hydrogen, but form stable double salts with the halides. As such alkali metal or alkaline earth metal halides there are especially suitable the chlorides or fluorides, for example, sodium chloride, potassium chloride or fluoride, lithium chloride or fluoride, calcium chloride or fluoride, magnesium chloride or fluoride and barium chloride or fluoride. Especially suitable, in particular for purifying tantalum pentachloride to remove tungsten oxychloride therefrom, is sodium chloride which is maintained in the reaction zone at a temperature within the range of 250–550° C., and advantageously 400–450° C.

Tungsten oxychloride is an impurity that is frequently present and is especially harmful owing to the fact that relatively small differences in boiling point make it very difficult to bring about a separation, for example, by distillation. Moreover, as tungsten oxychloride forms an azeotropic mixture with tantalum pentachloride it is not possible to bring about a complete separation of these substances by distillation.

However, the process is not limited to the removal of tungsten oxychloride and with a suitable choice of temperature and of the alkali metal or alkaline earth metal halide for the separation of iron, aluminum, zirconium, hafnium, vanadium, arsenic, tellurium, and also niobium and titanium from tantalum chlorides.

The following examples illustrate the invention:

*Example 1*

74 grams of a mixture, consisting of 83.5% by weight of tantalum pentachloride, 16.1% by weight of tungsten oxychloride ($WOCl_4$) and 0.4% by weight of niobium pentachloride, is passed, entrained in a stream of hydrogen having a rate of 1.8 liters per minute, through a bed of dry granular sodium chloride having a particle size of 2–5 millimeters, which bed has a length of 45 centimeters and a diameter of 2 centimeters, and is heated at 430° C. The chloride mixture is supplied to the bed at an average rate of 11.4 grams per hour. After passage through the sodium chloride bed, 54.0 grams of tantalum pentachloride were condensed, while 7.0 grams of tantalum pentoxide (formed from the O-content of $WOCl_4$) were fixed on the sodium chloride by way of the intermediately formed water vapour.

The sublimate of tantalum pentachloride had contents of niobium and tungsten, calculated as the oxides, of less than 0.02% of $Nb_2O_5$ and less than 0.01% of $WO_3$. The yield of tantalum pentachloride, calculated on the initial amount thereof after deduction of losses due to the side reaction

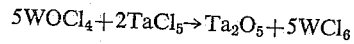
$$5WOCl_4 + 2TaCl_5 \rightarrow Ta_2O_5 + 5WCl_6$$

amounted to about 95.1%; in a further run, a yield of 99% was obtained.

*Example 2*

A quartz tube having an internal diameter of 2 centimeters was filled for a length of 45 centimeters with dry granular sodium chloride. The sodium chloride was prepared by first fusing it and then disintegrating the cooled fused mass to a particle size of about 2–5 millimeters. By external heating the sodium chloride in the tube was brought to a temperature of about 430–445° C. A mixture having the following composition

|  | Percent by weight |
|---|---|
| $TaCl_5$ | 42.1 |
| $NbCl_5$ | 42.8 |
| $FeCl_3$ | 14.2 |
| $WOCl_4$ | 0.9 | was slowly brought to a temperature of 380° C., and the resulting mixture of vapours was pased in a current of hydrogen having a rate of 1 liter per minute through the quartz tube, so that 30.0 grams of the mixture passed through in 2 hours.

The sublimate collected at the exit of the quartz tube had the following composition

|  | Percent by weight |
|---|---|
| $TaCl_5$ | 56.7 |
| $NbCl_5$ | 43.2 |
| $WOCl_4$ | <0.01 |
| $FeCl_3$ | Trace |

*Example 3*

A quartz tube having an internal diameter of 2 centimeters was filled for a length of 45 centimeters with dry granular potassium chloride, which had been prepared by first fusing potassium chloride and then disintegrating the cooled mass to a particle size of 2–5 millimeters. The sodium chloride was then heated to 495–515° C. by heating externally. The mixture of chlorides used as starting material in Example 2 was slowly brought to a temperature of 315° C., and the resulting mixture of vapours was passed in a current of hydrogen having a rate of 1.8 liters per minute through the tube, so that in the course of 5 hours 27.0 grams of the mixture were treated.

The sublimate collected at the exit of the tube had the following composition

| | Percent by weight |
|---|---|
| $TaCl_5$ | >99.97 |
| $NbCl_5$ | 0.02 |
| $WOCl_4$ | <0.01 |
| $FeCl_3$ | Trace |

What is claimed is:

1. In a process for purifying tantalum pentachloride containing impurities selected from the group consisting of chlorides of iron and oxychlorides of tungsten the improvement of passing the impure tantalum pentachloride in gaseous phase together with sufficient amounts of hydrogen to reduce a substantial part of said impurities, over a granular bed of a halide selected from the group consisting of the alkali metal and alkaline earth metal chlorides and fluorides and mixtures thereof, maintaining said bed at a temperature between about 250° and 550° C. thereby forming stable double salts of the at least partially reduced impurities in the solid phase while leaving tantalum pentachloride unreduced, and condensing the unreduced and purified tantalum pentachloride at room temperature.

2. A process according to claim 1, wherein the halide is sodium chloride.

3. A process according to claim 1, wherein the halide is potassium chloride.

4. A process according to claim 1, wherein the halide is lithium chloride.

5. A process according to claim 1, wherein the halide is calcium chloride.

6. A process according to claim 1, wherein the halide is calcium fluoride.

7. A process according to claim 1, wherein the halide is magnesium chloride.

8. A process according to claim 1, wherein the halide is magnesium fluoride.

9. A process according to claim 1, wherein the halide is barium chloride.

10. A process according to claim 1, wherein the halide is barium fluoride.

11. A process according to claim 1, wherein the halide is sodium chloride and the temperature of the bed is between about 400° to 450° C.

12. A process according to claim 1, wherein the starting tantalum pentachloride contains tungsten oxychloride as an impurity.

References Cited in the file of this patent

UNITED STATES PATENTS

| 2,744,060 | Eaton | May 1, 1956 |
| 2,847,316 | Michel et al. | Aug. 12, 1958 |
| 2,891,857 | Eaton | June 23, 1959 |
| 2,928,722 | Scheller | Mar. 15, 1960 |

FOREIGN PATENTS

| 487,834 | Great Britain | June 22, 1938 |